US012147553B2

(12) United States Patent
Tormasov et al.

(10) Patent No.: US 12,147,553 B2
(45) Date of Patent: Nov. 19, 2024

(54) SYSTEMS AND METHODS FOR PROVIDING ACCESS TO DATA BASED ON PRIVACY OF A USER LOCATION

(71) Applicant: Acronis International GmbH, Schaffhausen (CH)

(72) Inventors: Alexander Tormasov, Bremen (DE); Oleg Melnikov, Kirkland, WA (US); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 164 days.

(21) Appl. No.: 17/469,969

(22) Filed: Sep. 9, 2021

(65) Prior Publication Data
US 2022/0083680 A1 Mar. 17, 2022

Related U.S. Application Data

(60) Provisional application No. 63/079,598, filed on Sep. 17, 2020.

(51) Int. Cl.
*H04L 29/06* (2006.01)
*G06F 21/31* (2013.01)
*G06F 21/62* (2013.01)

(52) U.S. Cl.
CPC .......... *G06F 21/6218* (2013.01); *G06F 21/31* (2013.01); *G06F 2221/2111* (2013.01); *G06F 2221/2113* (2013.01); *G06F 2221/2141* (2013.01)

(58) Field of Classification Search
CPC ................. G06F 21/6218; G06F 21/31; G06F 2221/2111
See application file for complete search history.

(56) References Cited

U.S. PATENT DOCUMENTS

| | | | | |
|---|---|---|---|---|
| 2014/0173758 | A1* | 6/2014 | Bilbrey | H04W 8/005 726/29 |
| 2014/0366159 | A1* | 12/2014 | Cohen | G06F 21/10 726/28 |
| 2016/0210473 | A1* | 7/2016 | Cohen | G09G 5/14 |
| 2017/0126698 | A1* | 5/2017 | Minkovich | G06F 21/00 |

* cited by examiner

*Primary Examiner* — Jason K Gee
(74) *Attorney, Agent, or Firm* — ArentFox Schiff LLP; Michael Fainberg

(57) ABSTRACT

Disclosed herein are systems and method for securely providing access to data. In one exemplary aspect, a method may comprise receiving a request to access data on a computing device of a user and identifying a location of the computing device. The method may comprise determining whether access to the data is allowed in the location based on a location-based rule of a plurality of location-based rule. The method may comprise, in response to determining that access to the data is allowed in the location, detecting, via sensors of the computing device, (1) at least one other person different from the user or (2) a surveillance device in the location, and determining whether the at least one other person or the surveillance device can view the data without direct access to the computing device. If not, the method may comprise providing access to the data on the computing device.

20 Claims, 4 Drawing Sheets

SYSTEMS AND METHODS FOR PROVIDING ACCESS TO DATA BASED ON PRIVACY OF A USER LOCATION

CROSS-REFERENCE TO RELATED APPLICATIONS

This application claims the benefit of U.S. Provisional Application No. 63/079,598, filed Sep. 17, 2020, which is herein incorporated by reference.

FIELD OF TECHNOLOGY

The present disclosure relates to the field of data privacy, and, more specifically, to systems and methods for providing access to data based on privacy of a user location.

BACKGROUND

Controlling access to various kinds of information is often primarily dependent on user authentication (e.g., providing the correct username, password, biometric data, etc.). In some scenarios, advanced controls may involve continuous authentication requirements to prevent the possibility of user spoofing during a session involving the access of data or services. However, these methods may not always be sufficient and effective.

For example, there are situations when some information needs to be protected from the access of unauthorized persons who may be near the user. Even if the user is able to authenticate himself/herself, a nearby unauthorized person can get acquainted with private information (e.g., by watching the computer screen) despite not having formal access to the data. In another example, some information may be confidential and should not be accessible in public places (like internet cafes, co-working spaces, etc.). Again, even though the user has the credentials to access data, because the user may be connected to unsecure public Wi-Fi or due to the presence of surveillance cameras or other people, there is a risk of the data being stolen.

Thus, there exists a need to evaluate whether to provide access to data based on user location for increased security purposes.

SUMMARY

Aspects of the disclosure describe methods and systems for securely providing access to data. In one exemplary aspect, a method may comprise receiving a request to access data on a computing device of a user. The method may comprise identifying a location of the computing device. The method may comprise determining whether access to the data is allowed in the location based on a location-based rule of a plurality of location-based rule. The method may comprise, in response to determining that access to the data is allowed in the location, detecting, via sensors of the computing device, (1) at least one other person different from the user or (2) a surveillance device in the location. The method may comprise determining whether the at least one other person or the surveillance device can view the data without direct access to the computing device, and in response to determining that the at least one other person or the surveillance device cannot view the data, providing access to the data on the computing device.

In some aspects, the request further comprises access credentials of the user. Prior to determining whether access to the data is allowed in the location, the method may comprise verifying whether the user is authorized to access the data based on the access credentials, and in response to determining that the user is not authorized to access the data, denying the request.

In some aspects, in response to determining that the at least one other person or the surveillance device can view the data, the method may comprise determining whether the at least one other person or the surveillance device are authorized to access the data. In response to determining that the at least one other person or the surveillance device are authorized to access the data, the method may comprise providing access to the data on the computing device.

In some aspects, in response to determining that the at least one other person or the surveillance device can view the data, the method may comprise denying the request.

In some aspects, in response to determining that access to the data is not allowed in the location, the method may comprise denying the request.

In some aspects, the data is accessed via an audio-based interface. The method may comprise determining whether the at least one other person or the surveillance device can view the data without direct access to the computing device by determining whether the computing device is connected to an audio output device that solely outputs sound to the user, and in response to determining that the computing device is not connected to the audio output device, determining that the at least one other person or the surveillance device can view the data.

In some aspects, the data is accessed via a graphical user interface. The method may comprise determining whether the at least one other person or the surveillance device can view the data without direct access to the computing device by determining whether a display of the computing device is in line of sight of the at least one other person or the surveillance device, and in response to determining that the display is in the line of sight, determining that the at least one other person or the surveillance device can view the data.

In some aspects, the method may comprise detecting, via the sensors of the computing device, the at least one other person or the surveillance device in the location by broadcasting a discovery message from the computing device, receiving, from a plurality of devices, a respective response message, and identifying a subset of the plurality of devices that are located within a threshold distance from the computing device, wherein the subset comprises the surveillance device or devices of the at least one other person.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for providing access to data based on privacy at the user location. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
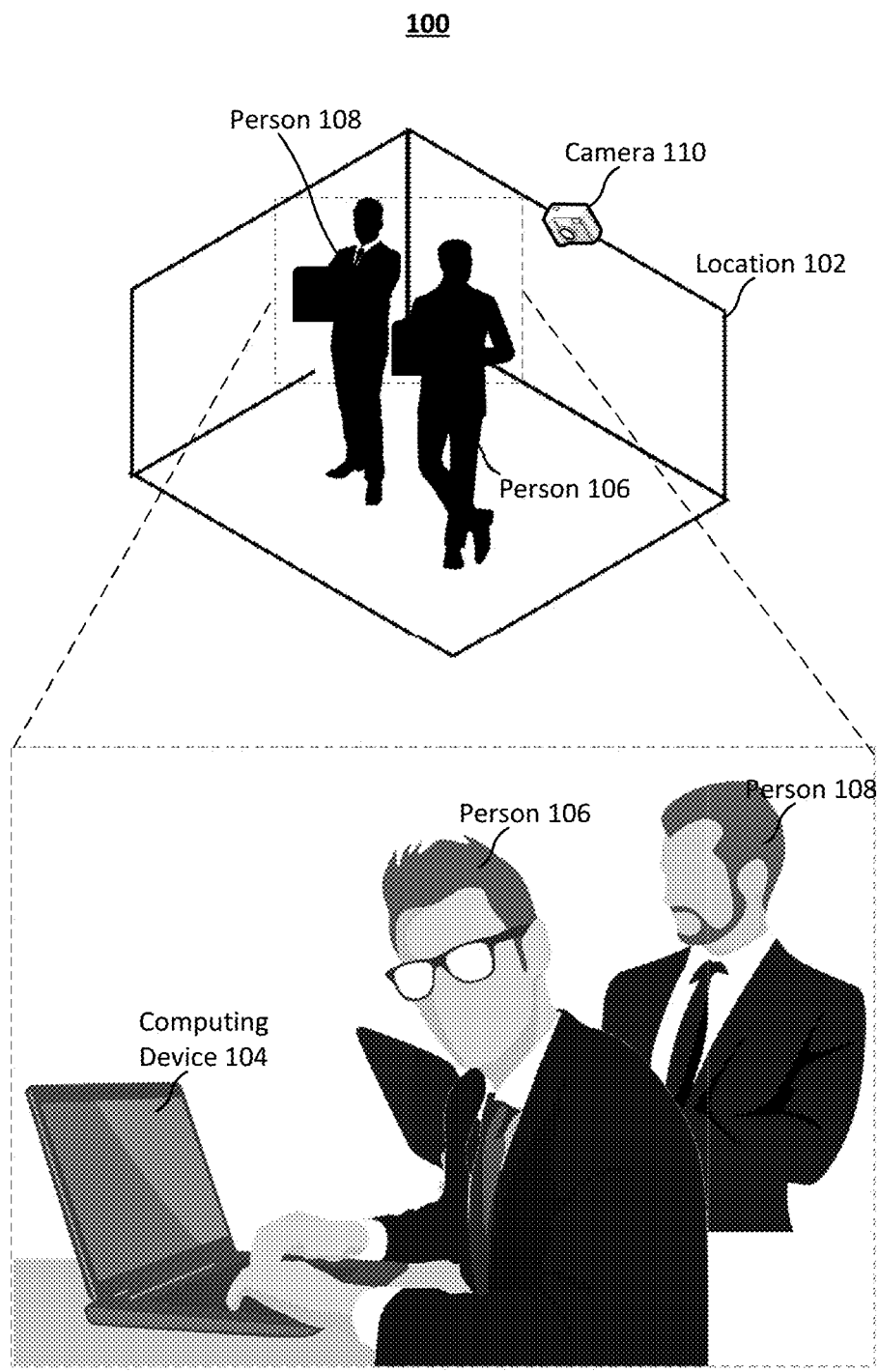
FIG. 1 is a diagram illustrating a scenario where data may be vulnerable despite a user having authentic access credentials.

FIG. 1 is a diagram illustrating scenario 100 where data may be vulnerable despite a user having authentic access credentials. Scenario 100 depicts location 102 in which person 106 is accessing computing device 104. In the vicinity of person 106, there may be person 108 and/or camera 110, that can potentially view or listen to any output provided by computing device 104. Accordingly, if person 106 attempts to access any type of data on computing device 104, despite having access credentials to view the data, the data can be viewed/heard by unauthorized persons or devices. If the data is private and there is a clear risk in exposing the data to anyone other than authorized users such as person 106, the data should not be accessible in scenario 100. For example, person 106 may be an employee of a company, the data may be a work document containing confidential client information, location 102 may be a public area such as a coffee shop with a surveillance camera (e.g., camera 110), and person 108 may be customer at the coffee shop.

Figure 2:
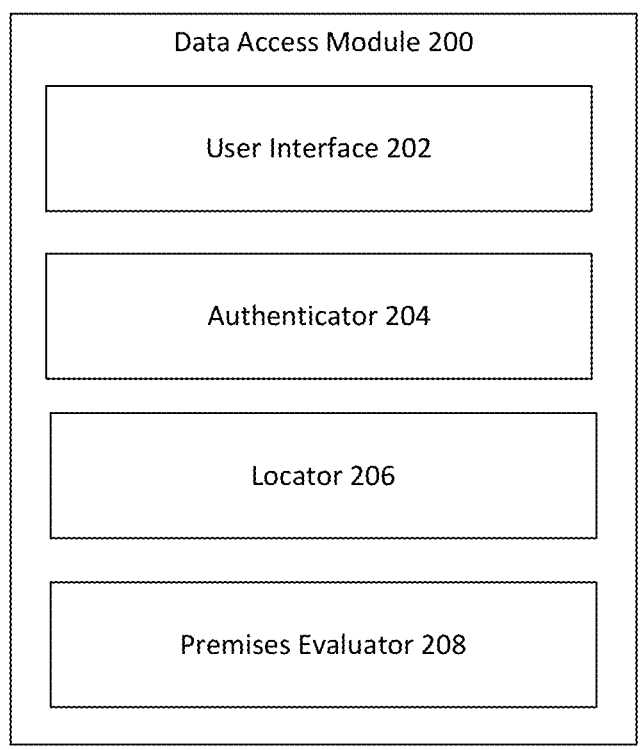
FIG. 2 is a block diagram illustrating a data access module for providing access to data based on privacy at a user location.

FIG. 2 is a block diagram illustrating data access module 200 for providing access to data based on privacy at a user location. Module 200 may be software that is installed on computing device 104 and comprises various components/functions such as user interface 202, authenticator 204, locator 206, and premises evaluator 208. In some aspects, module 200 may be installed as an add-on/extension on a web browser to monitor data presented by the web browser. In some aspects, module 200 may be installed as a plug-in of an application (e.g., a PDF reader or text editor) installed on computing device 104. In some aspects, module 200 may be an application running in the background of computing device 104 that intercepts user inputs on device 104 and can either prevent execution of certain actions or prevent the output from being seen. For example, the user may double click on a confidential word document. In response to determining that the word document should not be accessed in location 102 or that person 108 and/or camera 110 can view the data, module 200 may prevent execution of the command opening the document, or generate a visual output that overlaps on the word document such that the contents cannot be viewed.

In terms of components in module 200, user interface 202 receives a request to access data on computing device 104 used by person 106. For example, person 106 may attempt to access data such as documents, media, websites, files, etc., on computing device 104 such as a laptop, a smartphone, a computer, a smart speaker, etc. In some aspects, user interface 202 may intercept user inputs in other applications that will output the requested data.

In some aspects, the request may be accompanied by access credentials of person 104 (e.g., a username and password, fingerprint, facial image, voice input, security certificate, special identification, etc.). Authenticator 204, which performs the decision-making on whether to allow access to the requested data, may verify whether the user is authorized to access the data based on the access credentials. For example, authenticator 204 may determine whether the access credentials matched the store credentials required to gain access to the requested data. If the user is not authorized (i.e., the access credentials provided are invalid, authenticator 204 may deny the request.

Locator 206 is configured to identify location 102 of computing device 104. For example, locator 206 may determine the global positioning system (GPS) coordinates of computing device 104 and classify the location. In some aspects, locator 206 may determine the location using the connectivity of computing device 104. For example, computing device 104 may be connected to Wi-Fi or a mobile data connection. Depending on the location of the router or antenna, locator 206 may approximate the location. In scenario 100, locator 206 may determine the GPS coordinates of computing device 104 and determine that the coordinates correspond to a public coffee shop.

Authenticator 204 may subsequently determine whether access to the requested data is allowed in location 102. Authenticator 204 may access a database comprising a plurality of location-based rules. The rules may indicate whether a certain data type (e.g., txt file, mpg file, etc.) or a certain file with an assigned privacy setting (e.g., labelled confidential) are allowed to be accessed in various locations. For example, a rule may indicate that word documents cannot be accessed in the public coffee shop. The rules may be managed by person 104 (i.e., the user of computing device 104), an administrative entity (e.g., the I.T department of a company where person 104 is an employee), or a service provider (e.g., a company that provides a streaming platform where certain media is locked in select locations). Thus, rules may differ from one device to another. A user's personal device may not have the same restrictions as a user's work device.

In response to determining that access to the requested data is allowed in the location 102, premises evaluator 208 may detect, via sensors of computing device 104, (1) at least one other person different from the user (e.g., person 108) or (2) a surveillance device (e.g., camera 110) in location 102. Premises evaluator 208 may be configured to receive information from sensors and services provided by computing device 104 to "describe" the surroundings of computing device 104 to authenticator 204. For example, premises evaluator 208 may receive any combination of information from geolocation sensors, Bluetooth, Wi-Fi, NFC modules, mobile communication equipment such as access points, routers, cellular stations, etc., to determine the position of the device owner relative to spatial objects as well as relative to other users.

In some aspects, premises evaluator 208 may broadcast a discovery message via computing device 104 (e.g., via Bluetooth), and receive, from a plurality of devices, a respective response message. Premises evaluator 208 may then identify a subset of the plurality of devices that are located within a threshold distance (e.g., 2 feet) from computing device 104, wherein the subset comprises the surveillance device (e.g., camera 110) or devices of the at least one other person (e.g., person 108).

As premises evaluator 208 identifies devices such as smartphones and surveillance devices along with their respective positions relative to computing device 104, authenticator 204 determines whether the at least one other person (e.g., person 108) or the surveillance device (e.g., camera 110) will be able to view the requested data without direct access to computing device 104.

For example, in some aspects, the data is accessed via an audio-based interface (e.g., computing device 104 is a smartphone and the data requested is audibly outputted). The surveillance device may be any device that has a microphone that is capable of recording the output (e.g., a smart speaker). Accordingly, authenticator 204 may determine that there are devices in the vicinity that can capture the data requested. An approach to prevent the output entirely is by determining whether the output would only be accessible to person 104. For example, authenticator 204 may determine whether the computing device is connected to an audio output device (e.g., headphones) that solely outputs sound to the authorized user-making the output inaccessible to the devices in the vicinity or other people. In response to determining that computing device 104 is not connected to the audio output device, authenticator 204 may determine that the at least one other person or the surveillance device can access the data.

In another aspect, authenticator 204 may determine whether the computing device is connected to a private screen. A private screen may be a virtual reality (VR) headset or a screen that is not viewable when viewed from an indirect angle. In terms of VR, certain VR headsets feature a magnetic activator that automatically indicates to a computing device (e.g., a smartphone) that the computing device has been placed in a VR headset. Accordingly, authenticator 204 may detect that the output is solely accessible to person 104 in response to receiving an indication, via the magnetic activator, that the computing device is in the VR headset. In terms of private screens, physical privacy filters may be attached to the computing device display that prevent light from passing via various angles. Authenticator 204 may request, via user interface 202, a confirmation of whether a user has applied a physical privacy filter on the display of the computing device. If a privacy filter has been applied (i.e., attached, fused, or fastened), authenticator 204 may determine that the output would only be accessible to person 104.

In some aspects, the data is accessed via a graphical user interface (e.g., a display of computing device 104). Thus, authenticator 204 determines whether the display of computing device 104 is in the line of sight of the at least one other person or the surveillance device. If computing device 104 has a built-in camera, for example, authenticator 204 may determine whether person 108 or camera 110 are in view of the built-in camera. If either one is in view, it is possible that the display of computing device 104 is in the line of sight. In response to determining that the display is in the line of sight, determining that the at least one other person or the surveillance device can view the data.

Suppose that computing device 104 is a laptop or a smartphone with a front-facing camera. Authenticator 204 may capture a plurality of images during a period of time (e.g., 10 seconds) and determine whether there are any faces other than the face of an authorized user in the images. Using facial recognition, authenticator 204 may learn the face(s) of authorized user(s) and tag their images as "authorized personnel" (e.g., an employer may provide ID card photos for all employees in an office, wherein each employee is authorized to access company data including the output). For any other faces detected, however, authenticator 204 may determine that there are additional individuals in the vicinity of the computing device that do not have authorization. In this case, it is assumed that if a face of a person can be captured by the front-facing camera, the display of computing device 104 (and hence, the output) is in the line of sight for that person. In some aspects, authenticator 204 may specifically require that the eyes of the unauthorized person are targeted towards the display of computing device 104 in order to conclude that the line of sight is established. Likewise, using object recognition techniques in computer vision, authenticator 204 may identify whether a camera or a lens is in the plurality of images. If a camera or a lens is detected, authenticator 204 may determine that the display of computing device 104 is in the line of sight of the camera. In some aspects, authenticator 204 may periodically capture images to ensure that an unauthorized user has not established line of sight at a later period in time. In some aspects, authenticator 204 may perform this verification continuously.

If person 108 or camera 110 can view/access the data when it is output via computing device 104, the data may be deemed at risk of exposure to unauthorized persons/devices. Accordingly, authenticator 204 may deny the request to access the data by person 104. If person 104 requests the data in a different location where other people or devices cannot access the data, authenticator 204 may approve the request.

In some aspects, each type of data accessed has a privacy level. These privacy levels may be stored in the metadata of the data requested. For example, a first privacy level may enable unauthorized persons to view the output on computing device 104, but not allow cameras (that can potentially record and store data) to have line of sight viewing to the output. In a second privacy level, neither unauthorized persons or cameras may be allowed to be in line of sight to the output. In a third privacy level, there may be no restrictions to viewing the output. In a fourth privacy level, the output may only be shown for a short period of time in response to the detection that line of sight is established with an unauthorized person or camera (e.g., display for 10 seconds).

In some aspects, if the output is viewable by an unauthorized user or camera and depending on the mobility of computing device 104, authenticator 204 may generate a request on user interface 202 to reposition computing device 104. For example, authenticator 204 may determine the type of device that computing device 104 is, based on its configuration settings and metadata. If the type is in a predetermined list of mobile device types (e.g., smartphone, laptop, etc.), authenticator 204 may determine that computing device 104 may be moved in another location, or the angle at which the device is being held may be changed. In response to detecting the change, which may be done by relying on an accelerometer or user confirmation, authenticator 204 may reevaluate whether the output is viewable by an unauthorized user or camera.

In some aspects, authenticator 204 may determine whether the at least one other person or the surveillance device are authorized to access the data. For example, location 102 may be an office of person 104, person 108 may be a co-worker, and the surveillance device may be a work phone of person 108. In response to determining that the at least one other person or the surveillance device are authorized to access the data (e.g., person 108 has access credentials to access the requested data and camera 110 is placed in a whitelist of allowed devices), authenticator 204 may provide access to the data on computing device 104.

Figure 3:
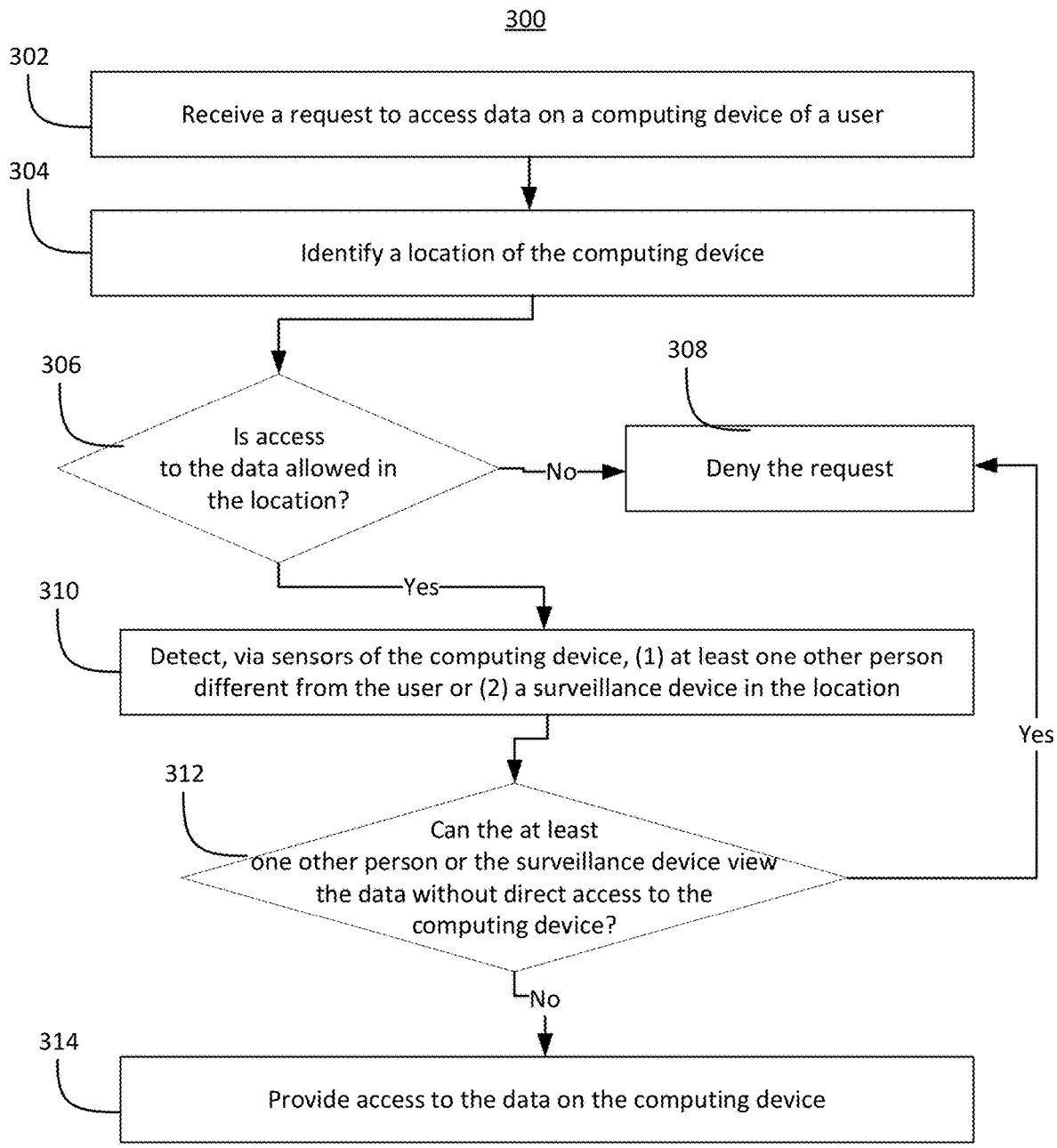
FIG. 3 illustrates a flow diagram of a method for providing access to data based on privacy at a user location.

FIG. 3 illustrates a flow diagram of method 300 for providing access to data based on privacy at a user location. At 302, user interface 202 receives a request to access data on a computing device of a user. At 304, locator 206 identifies a location of computing device 104. At 306, authenticator 204 determines whether access to the data is allowed in the location. In response to determining that access is not allowed, method 300 ends at 308, where authenticator 204 denies the request.

In response to determining that access is allowed in the location, method 300 proceeds to 310, where premises evaluator 208 detects, via sensors of the computing device, (1) at least one other person different from the user or (2) a surveillance device in the location. At 312, authenticator 204 determines whether the at least one other person or the surveillance device can view the data without direct access to the computing device. In response to determining that they can view the data, method 300 returns to 308 and authenticator 204 denies the request. If it is determined that they cannot view the data, authenticator 204 provides access to the data on computing device 104.

Figure 4:
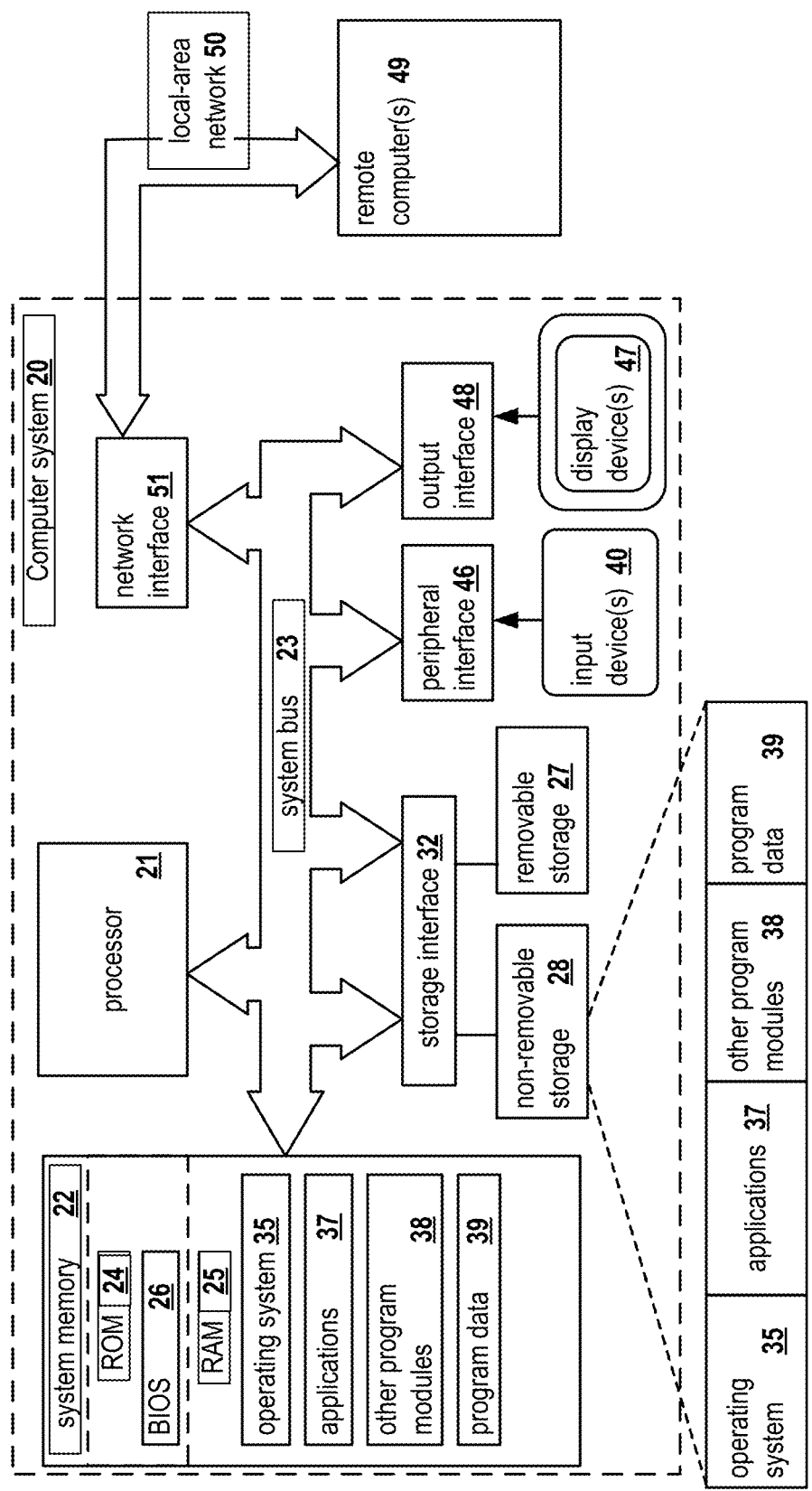
FIG. 4 presents an example of a general-purpose computer system on which aspects of the present disclosure can be implemented.

FIG. 4 is a block diagram illustrating a computer system 20 on which aspects of systems and methods for providing access to data based on privacy at a user location may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for securely providing access to data, the method comprising:
   receiving a request to access data on a computing device of a user, wherein the computing device is a mobile device with an accelerometer;
   identifying a location of the computing device;
   determining whether access to the data is allowed in the location based on a location-based rule of a plurality of location-based rules;
   in response to determining that access to the data is allowed in the location, detecting, via sensors of the computing device, (1) at least one other person different from the user or (2) a surveillance device in the location;
   determining whether eyes of the at least one other person or a lens of the surveillance device are targeted towards a display of the computing device such that the at least one other person or the surveillance device can view the data without direct access to the computing device;
   in response to determining that the eyes of at least one other person or the lens of the surveillance device are targeted towards the display, re-evaluating whether to provide access to the data until the at least one other person or the surveillance device cannot view the data, wherein the re-evaluating comprises:

determining, using the accelerometer, whether an angle at which the computing device is being held has changed to a new angle;

in response to detecting a change in the angle:

determining whether the at least one other person or the surveillance device can view the data at the new angle; and in response to determining that the at least one other person or the surveillance device cannot view the data at the new angle, providing access to the data on the computing device.

2. The method of claim 1, wherein the request further comprises access credentials of the user, further comprising prior to determining whether access to the data is allowed in the location:

verifying whether the user is authorized to access the data based on the access credentials;

in response to determining that the user is not authorized to access the data, denying the request.

3. The method of claim 1, further comprising:

in response to determining that the at least one other person or the surveillance device can view the data, determining whether the at least one other person or the surveillance device are authorized to access the data; and in response to determining that the at least one other person or the surveillance device are authorized to access the data, providing access to the data on the computing device.

4. The method of claim 1, further comprising:

in response to determining that the at least one other person or the surveillance device can view the data, denying the request.

5. The method of claim 1, further comprising:

in response to determining that access to the data is not allowed in the location, denying the request.

6. The method of claim 1, wherein the data is accessed via an audio-based interface, and wherein determining whether the at least one other person or the surveillance device can view the data without direct access to the computing device further comprises:

determining whether the computing device is connected to an audio output device that outputs sound to the user; and in response to determining that the computing device is not connected to the audio output device, determining that the at least one other person or the surveillance device can view the data.

7. The method of claim 1, wherein the data is accessed via a graphical user interface, and wherein determining whether the at least one other person or the surveillance device can view the data without direct access to the computing device further comprises:

determining whether a display of the computing device is in line of sight of the at least one other person or the surveillance device;

in response to determining that the display is in the line of sight, determining that the at least one other person or the surveillance device can view the data.

8. The method of claim 1, wherein detecting, via sensors of the computing device, the at least one other person or the surveillance device in the location further comprises:

broadcasting a discovery message from the computing device;

receiving, from a plurality of devices, a respective response message;

identifying a subset of the plurality of devices that are located within a threshold distance from the computing device, wherein the subset comprises the surveillance device or devices of the at least one other person.

9. A system for securely providing access to data, the system comprising:

a hardware processor configured to:

receive a request to access data on a computing device of a user, wherein the computing device is a mobile device with an accelerometer;

identify a location of the computing device;

determine whether access to the data is allowed in the location based on a location-based rule of a plurality of location-based rules;

in response to determining that access to the data is allowed in the location, detect, via sensors of the computing device, (1) at least one other person different from the user or (2) a surveillance device in the location;

determine whether eyes of the at least one other person or a lens of the surveillance device are targeted towards a display of the computing device such that the at least one other person or the surveillance device can view the data without direct access to the computing device;

in response to determining that the eyes of at least one other person or the lens of the surveillance device are targeted towards the display, re-evaluate whether to provide access to the data until the at least one other person or the surveillance device cannot view the data, wherein when re-evaluating the hardware processor is configured to:

determine, using the accelerometer, whether an angle at which the computing device is being held has changed to a new angle;

in response to detecting a change in the angle:

determine whether the at least one other person or the surveillance device can view the data at the new angle; and in response to determining that the at least one other person or the surveillance device cannot view the data at the new angle, provide access to the data on the computing device.

10. The system of claim 9, wherein the request further comprises access credentials of the user, wherein the hardware processor is further configured to, prior to determining whether access to the data is allowed in the location:

verify whether the user is authorized to access the data based on the access credentials;

in response to determining that the user is not authorized to access the data, deny the request.

11. The system of claim 9, wherein the hardware processor is further configured to:

in response to determining that the at least one other person or the surveillance device can view the data, determine whether the at least one other person or the surveillance device are authorized to access the data; and in response to determining that the at least one other person or the surveillance device are authorized to access the data, provide access to the data on the computing device.

12. The system of claim 9, wherein the hardware processor is further configured to:

in response to determining that the at least one other person or the surveillance device can view the data, deny the request.

13. The system of claim 9, wherein the hardware processor is further configured to:
in response to determining that access to the data is not allowed in the location, deny the request.

14. The system of claim 9, wherein the data is accessed via an audio-based interface, and wherein the hardware processor is further configured to determine whether the at least one other person or the surveillance device can view the data without direct access to the computing device by:
determining whether the computing device is connected to an audio output device that outputs sound to the user; and
in response to determining that the computing device is not connected to the audio output device, determining that the at least one other person or the surveillance device can view the data.

15. The system of claim 9, wherein the data is accessed via a graphical user interface, and wherein the hardware processor is further configured to determine whether the at least one other person or the surveillance device can view the data without direct access to the computing device by:
determining whether a display of the computing device is in line of sight of the at least one other person or the surveillance device;
in response to determining that the display is in the line of sight, determining that the at least one other person or the surveillance device can view the data.

16. The system of claim 9, wherein the hardware processor is further configured to detect, via the sensors of the computing device, the at least one other person or the surveillance device in the location by:
broadcasting a discovery message from the computing device;
receiving, from a plurality of devices, a respective response message;
identifying a subset of the plurality of devices that are located within a threshold distance from the computing device, wherein the subset comprises the surveillance device or devices of the at least one other person.

17. A non-transitory computer readable medium storing thereon computer executable instructions for securely providing access to data, including instructions for:
receiving a request to access data on a computing device of a user, wherein the computing device is a mobile device with an accelerometer;
identifying a location of the computing device;
determining whether access to the data is allowed in the location based on a location-based rule of a plurality of location-based rules;
in response to determining that access to the data is allowed in the location, detecting, via sensors of the computing device, (1) at least one other person different from the user or (2) a surveillance device in the location;
determining whether eyes of the at least one other person or a lens of the surveillance device are targeted towards a display of the computing device such that the at least one other person or the surveillance device can view the data without direct access to the computing device;
in response to determining that the eyes of at least one other person or the lens of the surveillance device are targeted towards the display, re-evaluating whether to provide access to the data until the at least one other person or the surveillance device cannot view the data, wherein the re-evaluating comprises:
determining, using the accelerometer, whether an angle at which the computing device is being held has changed to a new angle;
in response to detecting a change in the angle:
determining whether the at least one other person or the surveillance device can view the data at the new angle; and
in response to determining that the at least one other person or the surveillance device cannot view the data at the new angle, providing access to the data on the computing device.

18. The non-transitory computer readable medium of claim 17, wherein the request further comprises access credentials of the user, further comprising instructions for prior to determining whether access to the data is allowed in the location:
verifying whether the user is authorized to access the data based on the access credentials;
in response to determining that the user is not authorized to access the data, denying the request.

19. The non-transitory computer readable medium of claim 17, further comprising instructions for:
in response to determining that the at least one other person or the surveillance device can view the data, determining whether the at least one other person or the surveillance device are authorized to access the data; and
in response to determining that the at least one other person or the surveillance device are authorized to access the data, providing access to the data on the computing device.

20. The non-transitory computer readable medium of claim 17, further comprising instructions for:
in response to determining that the at least one other person or the surveillance device can view the data, denying the request.

* * * * *